US012128534B2

(12) United States Patent
Klatt et al.

(10) Patent No.: US 12,128,534 B2
(45) Date of Patent: Oct. 29, 2024

(54) TORQUE TOOL

(71) Applicant: HAZET-WERK Hermann Zerver GmbH & Co. KG, Remscheid (DE)

(72) Inventors: Patrick Klatt, Hagen (DE); Christian Ballsieper, Remscheid (DE)

(73) Assignee: HAZET-WERK HERMANN ZERVER GMBH & CO. KG, Remscheid (DE)

( * ) Notice: Subject to any disclaimer, the term of this patent is extended or adjusted under 35 U.S.C. 154(b) by 0 days.

(21) Appl. No.: 18/287,174

(22) PCT Filed: Mar. 10, 2022

(86) PCT No.: PCT/DE2022/100196

§ 371 (c)(1),
(2) Date: Oct. 16, 2023

(87) PCT Pub. No.: WO2022/223068

PCT Pub. Date: Oct. 27, 2022

(65) Prior Publication Data

US 2024/0198503 A1 Jun. 20, 2024

(30) Foreign Application Priority Data

Apr. 21, 2021 (DE) ..................... 20 2021 102 127.6

(51) Int. Cl.
*B25B 23/142* (2006.01)

(52) U.S. Cl.
CPC ................................ *B25B 23/1427* (2013.01)

(58) Field of Classification Search
CPC .............. B25B 23/142; B25B 23/1422; B25B 23/1427; B25B 23/04; B25B 23/155;
(Continued)

(56) References Cited

U.S. PATENT DOCUMENTS 2,732,747 A * 1/1956 Livermont .......... B25B 23/1427 267/175
2,887,921 A * 5/1959 Livermont .......... B25B 23/1427 73/862.23

(Continued)

FOREIGN PATENT DOCUMENTS

CN 201082530 Y 7/2008
CN 108621073 A 10/2018

(Continued)

OTHER PUBLICATIONS

Written Opinion of the International Searching Authority of International Application No. PCT/DE2022/100196 mailed May 25, 2022; 14pp.

(Continued)

*Primary Examiner* — David B. Thomas
(74) *Attorney, Agent, or Firm* — HAUPTMAN HAM, LLP

(57) ABSTRACT

A torque tool has a handle, and a setting body rotatable about the longitudinal axis of the handle and lockable to the handle by a locking body having a switching ring. The switching ring is linearly displaceable relative to the locking body. A switching pin is provided on the switching ring, and supported on a control track in the setting body. Between the switching ring and the locking body, a locking disc and a spring element loading the locking disc are arranged. The locking disc has latching bodies interacting with latching receptacles in the handle. By rotating the locking body, the switching pin is moved along the control track causing an axial movement of the switching ring and the locking disc relative to the handle, to move the latching bodies out of, or into engagement with, the latching receptacles to unlock, or lock, the setting body.

11 Claims, 5 Drawing Sheets

(58) Field of Classification Search
CPC ... B25B 23/159; B25B 23/0035; B25B 15/02; B25B 15/04
See application file for complete search history.

(56) References Cited

U.S. PATENT DOCUMENTS

| | | | | |
|---|---|---|---|---|
| 5,048,381 | A | 9/1991 | Allen et al. | |
| 5,546,816 | A | 8/1996 | Jansson et al. | |
| 7,044,036 | B1 * | 5/2006 | Salazar | B25B 23/1427 81/478 |
| 8,479,620 | B2 * | 7/2013 | Chen | B25B 23/1427 81/478 |
| 8,960,058 | B2 * | 2/2015 | Lai | B25B 23/141 81/475 |
| 9,999,966 | B2 * | 6/2018 | Ballsieper | B25B 23/1427 |
| 11,052,517 | B2 * | 7/2021 | Hsieh | B25B 23/0007 |
| 11,213,936 | B2 * | 1/2022 | Chen | B25B 23/1427 |
| 11,311,989 | B2 * | 4/2022 | Wu | B25B 23/16 |
| 11,446,799 | B2 * | 9/2022 | Huang | B25B 23/1427 |
| 2009/0013836 | A1 * | 1/2009 | Chen | B25B 23/1427 81/468 |
| 2011/0113936 | A1 * | 5/2011 | Chiang | B25B 23/1427 81/483 |
| 2014/0352502 | A1 * | 12/2014 | Lai | B25B 23/141 81/475 |
| 2015/0090078 | A1 | 4/2015 | Yu | |
| 2015/0122525 | A1 | 5/2015 | Wei et al. | |
| 2016/0031070 | A1 * | 2/2016 | Ball | B25B 23/1427 81/479 |
| 2018/0050442 | A1 | 2/2018 | Ballsieper et al. | |
| 2022/0250218 | A1 * | 8/2022 | Chiang | B25B 23/1427 |

FOREIGN PATENT DOCUMENTS

| | | | |
|---|---|---|---|
| DE | 69005878 | T2 | 8/1994 |
| DE | 69307296 | T2 | 8/1997 |
| DE | 20309969 | U1 | 9/2003 |
| DE | 202011050282 | U1 | 7/2011 |
| DE | 102012020909 | B3 | 1/2014 |
| DE | 202017101615 | U1 | 4/2017 |
| JP | H07500777 | A | 1/1995 |
| TW | M438356 | U | 10/2012 |
| TW | M492808 | U | 1/2015 |
| TW | I581917 | B | 5/2017 |
| TW | M547455 | U | 8/2017 |
| WO | 2013143258 | A1 | 10/2013 |

OTHER PUBLICATIONS

Partial translation of International Search Report and Written Opinion for International Application No. PCT/DE2022/100196 mailed May 25, 2022; 16pp.
Search Report for German Application No. 20 2021 102 127.6 mailed Nov. 16, 2021; 7pp.
Translation of Office Action for Taiwan Application No. 111112743 mailed Jun. 27, 2023; 3pp.
Office Action for Japanese Application No. 2023-562949 dated May 13, 2024; 3pp.

* cited by examiner

TORQUE TOOL

TECHNICAL FIELD

The present disclosure relates to a torque tool, for example, a torque screwdriver.

BACKGROUND

Torque tools are hand-held tools with which torque can be applied to a workpiece, generally a screw or nut. A defined tightening torque can be applied with adjustable torque tools in order to ensure the necessary clamping force or assembly pre-load force between the components to be connected.

In the case of torque screwdrivers, a release mechanism is usually housed in the handle. In the case of other torque tools, the release mechanism can also be provided in the lever tube of the torque tool.

An adjustable torque screwdriver is disclosed in WO 2013/143258 A1.

An adjustment device including a display for a torque to be adjusted is provided in the handle or on the handle of a torque tool. The desired torque is adjusted by compressing a compression spring by rotating the setting body on the handle, which is connected to a setting mechanism, in particular a threaded spindle, relative to a fixed portion of the handle. In order to secure the respectively adjusted torque against unintentional adjusting when using the torque tool, the adjustment device is fixed by means of a lock that can be actuated via a locking body. The lock is unlocked to adjust the torque.

Various adjusting and locking units are known in the prior art. Depending on the embodiment, these perform their task satisfactorily and have proven themselves in practice. Nevertheless, the user does not normally understand how to operate them at first glance. The operation and user-friendliness also seems to be in need of improvement.

SUMMARY

The underlying object of the invention is to improve the application of a torque tool and to further develop the locking and unlocking in a functional and user-advantageous manner.

According to the invention, the solutions to this problem consist in a torque tool, in particular a torque screwdriver according to the independent claims.

Advantageous configurations and developments of the torque tool according to the invention are the subject matter of the dependent claims.

The torque tool and, in this case, in particular the torque screwdriver, has a handle and a setting body, which can be rotated about the longitudinal axis of the handle, for adjusting a torque. The setting body can be unlocked and locked in relation to the handle by means of a lock that includes a locking body. The lock causes a desired fixing or blocking of the setting body. When the lock is locked, it is not possible to actuate the setting body to adjust a torque. When the lock is unlocked, the setting body can be actuated; in particular, an adjustment mechanism or an adjustment device can be used to adjust a defined torque. In the torque tool according to the invention, this is done by twisting or rotating the setting body about the longitudinal axis of the handle.

According to the invention, a switching ring is assigned to the locking body. The switching ring is linearly displaceable relative to the locking body. At least one switching pin is provided on the switching ring, which is supported on a control track in the setting body. A locking disc and a spring element loading the locking disc are arranged between the switching ring and the locking body. The locking disc has latching bodies.

These preferably protrude radially laterally opposite the locking disc. The latching bodies interact with latching receptacles in the handle. By rotating the locking body, the switching pin or pins are moved along the control track. The geometric configuration of the control path causes an axial movement of the switching ring and the locking disc relative to the handle, as a result of which the latching body is moved out of a latching receptacle to unlock the setting element or can be moved out of it and is or can be brought into engagement with a latching receptacle to lock the setting body.

The configuration according to the invention can be implemented for torque screwdrivers as well as for torque spanners. It is of particular advantage that the torque setting configured according to the invention and the locking of a set torque enable intuitive operation by the user.

In order to adjust the torque tool to the desired torque value, the torque tool is held by the handle and adjusted to the desired torque value by rotating the setting body. In the locked state, the handle and the setting body are coupled to one another in order to prevent radial movement, i.e. a rotation of the setting body. The current locked or unlocked state can be displayed in at least one viewing window in the setting body that is present on the circumference. The number of viewing windows can be increased almost arbitrarily, taking into account the structural conditions.

By rotating the locking body, the switching positions and thus the respective locked or unlocked state are adjusted. It is completely irrelevant whether the rotation is clockwise or anti-clockwise. Consequently, the operator can reliably lock in both directions of rotation of the locking body. This is advantageous in use for the operator, regardless of whether he/she is right-handed or left-handed. The torque tool can be locked and unlocked very easily and reliably.

When the locking body rotates, the switching pins travel radially along the control path in the setting body, thereby generating an axial movement. The switching pins are arranged on the circumference of the switching ring. The number and division of the switching pins and the periodic or alternating repetition of the control path are designed in such a way that the switching positions can be changed by rotating the components relative to one another. Consequently, the switching position of unlocking and locking alternate in alternation. Here, the control path and its geometry can be designed in such a way that a change in the switching position is effected over equal angular distances over the circumference of a rotation. A change in the switching position can take place, for example, after a rotation angle of 30°, 45°, 60° or even 90°.

In order to change a switching position and thus the switching state, a direction of rotation to the right or left can take place without a stop. The control tracks arranged 360° in the setting body enable the switching state to be changed without a stop, since the switching pins arranged on the switching ring can travel along the control tracks. The direction of rotation in this process is completely arbitrary and takes place without a stop. The existing elevations and depressions help to find the appropriate switching points. The axial position of the locking disc, which changes when the control paths are travelled along, ensures the appropriate locking of the setting body.

The latching body preferably engages through a longitudinal slot in a sleeve section of the setting body. The latching body can be formed by webs or springs. The latching bodies reach through the longitudinal slot in the sleeve body of the setting body and protrude radially from the circumference of the sleeve section. In the longitudinal slots, the latching bodies are linear, i.e. straight and guided in the longitudinal axis of the handle.

Furthermore, there is an advantageous aspect in that the locking body and the switching ring can be moved linearly relative to one another by means of guide elements. Preferably, a guide element is formed on the locking body in the form of a guide spring on a port of the locking body and a guide element is formed on the switching ring in the form of a guide groove on the inner circumference of the switching ring.

An embodiment that is particularly advantageous in practice provides that the control track is formed circumferentially on an inner rim of the setting body, wherein elevations and depressions are provided alternately. The control track can have inclines, inclined sections or curved sections. It is essential that the control track and the switching pins moved along the control track generate a relative axial movement during the rotation of the setting body, by which the latching body or latching bodies can be moved out of a latching receptacle or into a latching receptacle.

Effectively, each elevation of the control track forms a switching position in which the setting body is unlocked, whereas each depression of the control track forms a switching position in which the setting body is locked. Optionally, detents or similarly designed securing contours can be provided in the individual switching positions, in which the switching pins can be positioned or are restricted by friction.

At least one viewing window for displaying the locked state of the setting body is provided on the circumference of a ring section of the setting body.

A plurality of viewing windows arranged offset from one another on the circumference are preferably provided.

In an advantageous configuration, the ring section encompasses a cover ring. The cover ring is assigned to the locking body in a rotationally fixed manner. The cover ring has symbols for visualising the locked state of the setting body, which are each visible through the at least one viewing window. These symbols can be pictograms, for example a lock in the open state or a lock in the closed state, which convey the relevant information about the locked state.

An advantageous embodiment of the torque tool according to the invention provides that the spring component is positioned on a holder component. This is advantageous in terms of construction as well as assembly technology.

The holder component has a base section and detent elements, wherein the detent elements engage in detent receptacles on the setting body.

The locking body and the switching ring are coupled only radially by means of the guide elements, in particular via a tongue and groove guide, so that the switching ring can move axially when travelling along the control track. The locking body and the switching ring can be moved linearly relative to one another by means of the guide elements. On the other side, the spring-loaded locking disc is supported tangentially on the switching pin. Each axial movement of the switching ring is transmitted synchronously to the locking disc. On the circumference of the locking disc there are preferably two, optionally also a plurality of locking bodies which engage through longitudinal slots in the sleeve section of the setting body and protrude from the respective longitudinal slot. In the locked or coupled state, the latching bodies can be integrated into the latching receptacles provided in the handle via the spring force acting on the locking disc. The latching receptacles are preferably designed as short grooves oriented along the longitudinal axis of the handle. If the latching bodies are integrated into the latching receptacles, a non-rotatable connection between the handle and the setting body is ensured. If the latching receptacles and the latching body are not on top of each other, they can only be integrated automatically or moved by the spring force when they are on top of each other or are congruent. The latching bodies then automatically latch into the latching receptacles due to the axial force of the spring element. When unlocking, the switching pin moves on the control track against the spring force of the spring element. As a result of the axial movement transmitted in this way, the latching body moves out of the latching receptacles in the handle. The lock is cancelled and the setting body is unlocked. The torque can be adjusted via the setting body. After the desired torque has been set, the locking body is moved into a switching position for locking the mechanism. The latching bodies engage in the latching receptacles and the torque tool or the torque adjustment is secured against an unintentional adjustment of the torque tool.

The lock engages independently or automatically. Since the locking disc is constantly subjected to an axial force by the spring element, the latching bodies can engage in the latching receptacles of their own accord.

The invention is explained in more detail in the following using the drawings. They indicate as follows:

DETAILED DESCRIPTION

Figure 1:
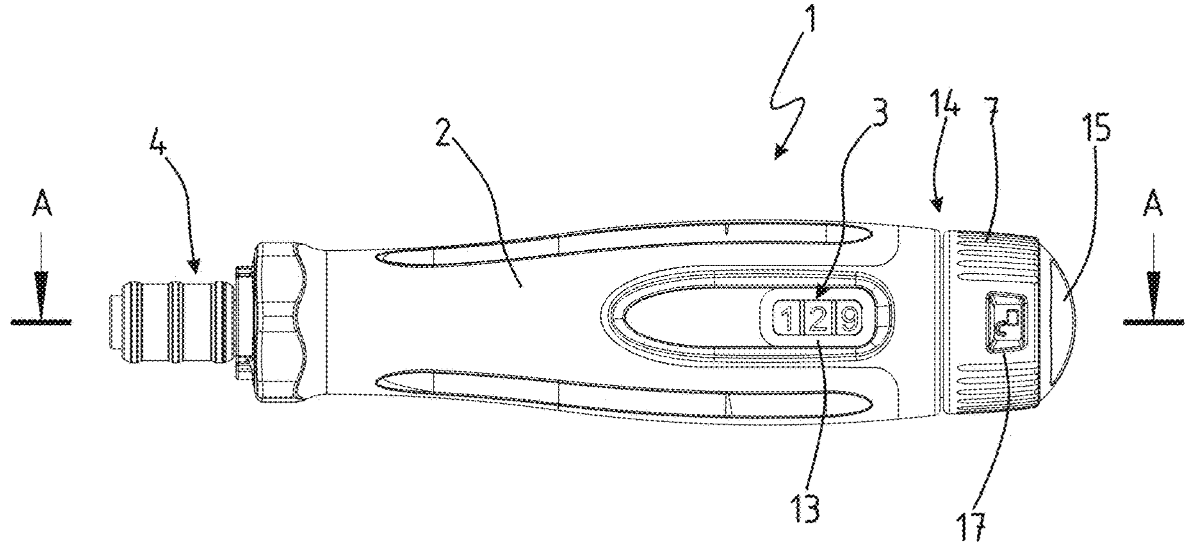
FIG. 1 shows a torque tool according to the invention in the form of a torque screwdriver with the lock open.
Figure 2:
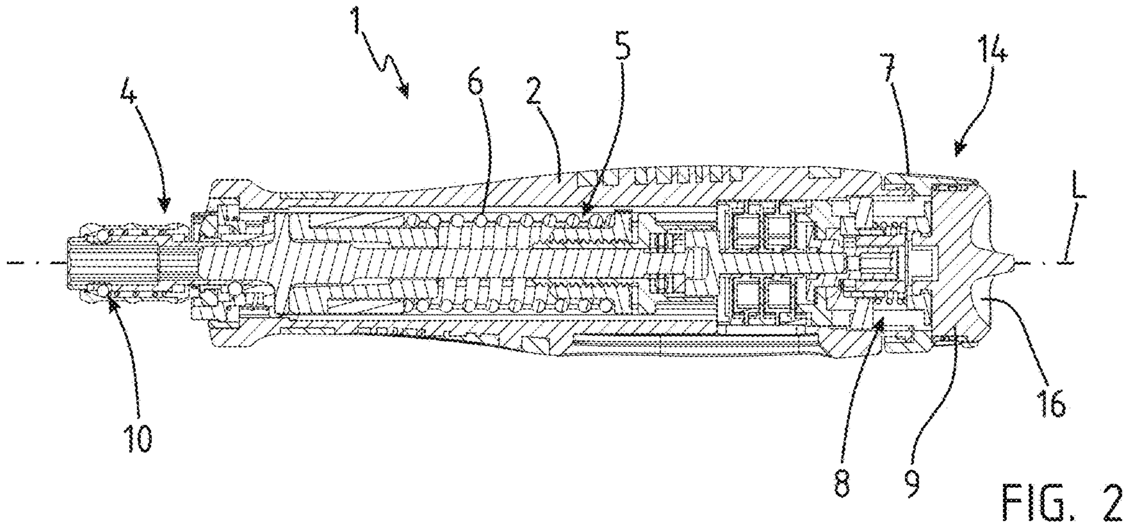
FIG. 2 shows a longitudinal cross-section through the illustration of FIG. 1 along line A-A.

A torque tool 1 according to the invention in the form of a torque screwdriver is described with reference to FIGS. 1 to 10 and FIG. 11.

The torque tool 1 has a handle 2 and a display 3 for an adjusted torque and an output 4. Integrated in the handle 2 is an adjustment device 5 for adjusting a specific torque or a defined tightening torque. The adjustment device 5 includes a setting mechanism, not described in detail here, with which the desired torque is adjusted by compressing a compression spring 6.

The adjustment device 5 and its setting mechanism interacts with a setting body 7 on the handle 2. The setting body 7 can be rotated about the longitudinal axis L relative to the handle 2. The torque is adjusted by rotating the setting body 7 relative to the fixed portion of the handle 2. In order to secure the respectively adjusted torque against an unintentional adjustment, the setting body 7 is fixed by means of a lock 8 which is actuated by a locking body 9.

The output 4 of the torque tool 1 is arranged on the front side in the handle 2. The output 4 is designed to accommodate exchangeable insertion tools. The output 4 is equipped with a holding system 10 intended for this purpose so that different insertion tools can be exchanged.

The display 3 for an adjusted torque has a digit roller counter 11 with a plurality of digit rollers 12 arranged one behind the other, which can be read through an opening 13 in the handle 2.

The setting body 7 can be unlocked and locked in relation to the handle 2 by a locking body 9. In order to bring the torque tool 1 to an adjustment value, the lock 8 of the setting body 7 is released. This is done by turning the locking body 9 at the rear grip end 14.

The locking body 9 is actuated manually. For this purpose, the locking body 9 is provided with a grip 15 and grip recesses 16 at the rear grip end 14. The locking body 9 can be rotated about the longitudinal axis L in both directions. By rotating the locking body 9, a change in the switching position or the locked state of the setting body 7 is effected from the unlocked state to the locked state and vice versa.

Figure 3:
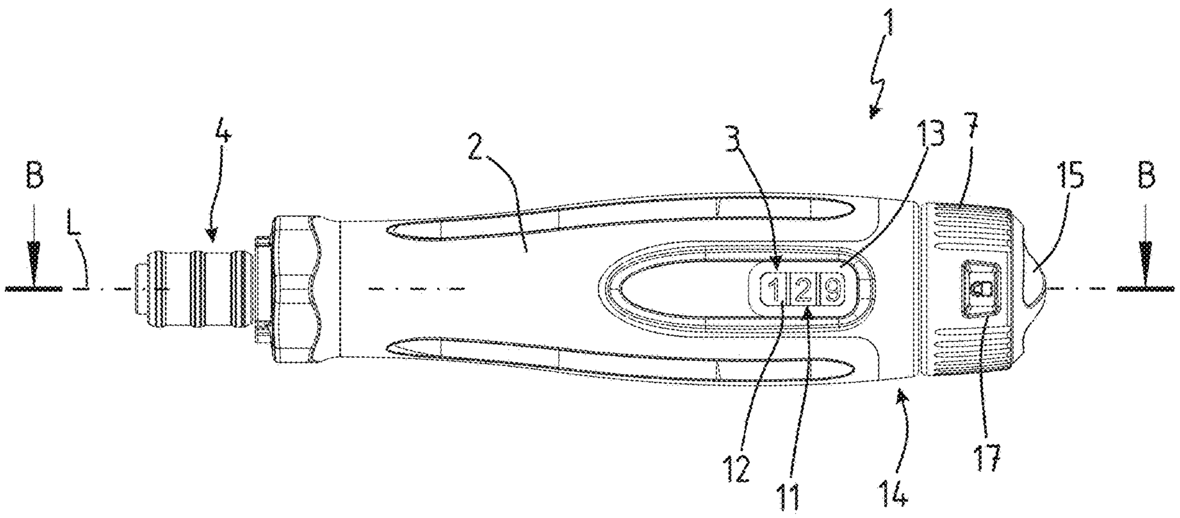
FIG. 3 shows the torque screwdriver according to FIG. 1 in a view with the lock closed.
Figure 4:
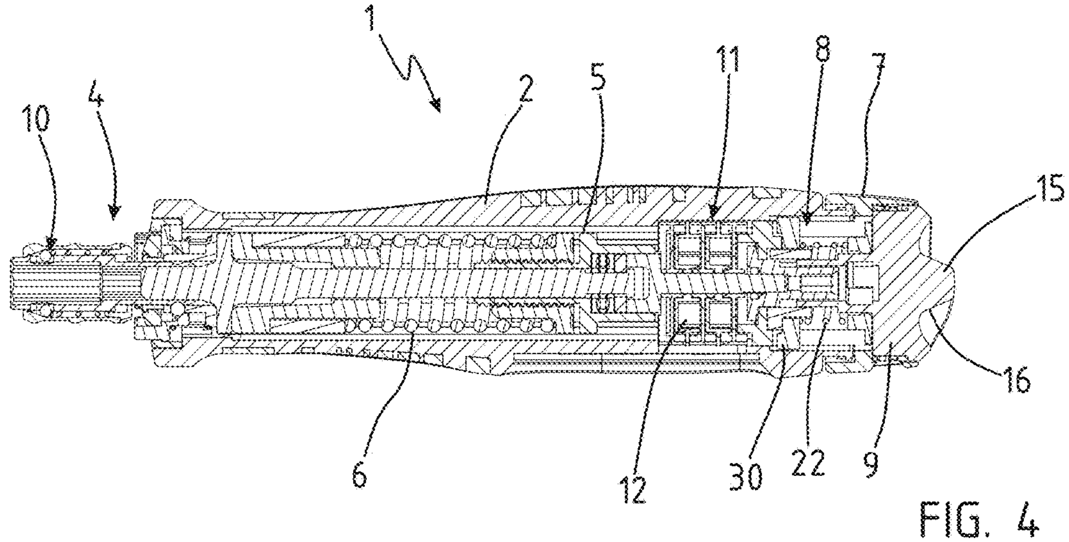
FIG. 4 shows a cross-section through the illustration of FIG. 3 along line B-B.
Figure 5:
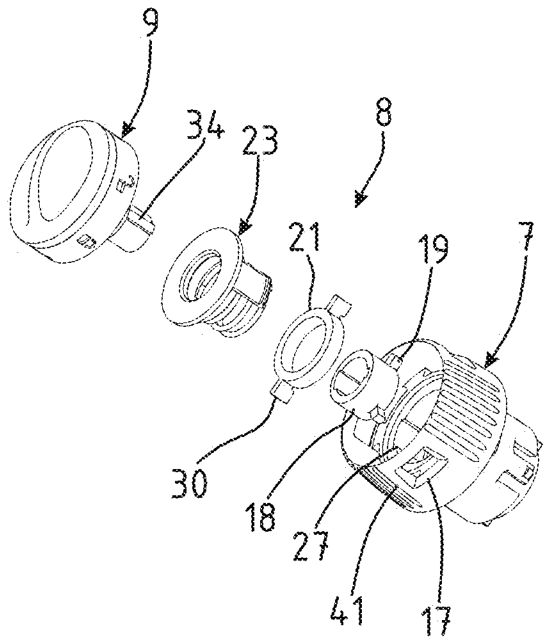
FIG. 5 shows components of the lock and the setting body in a perspective exploded view.
Figure 6:
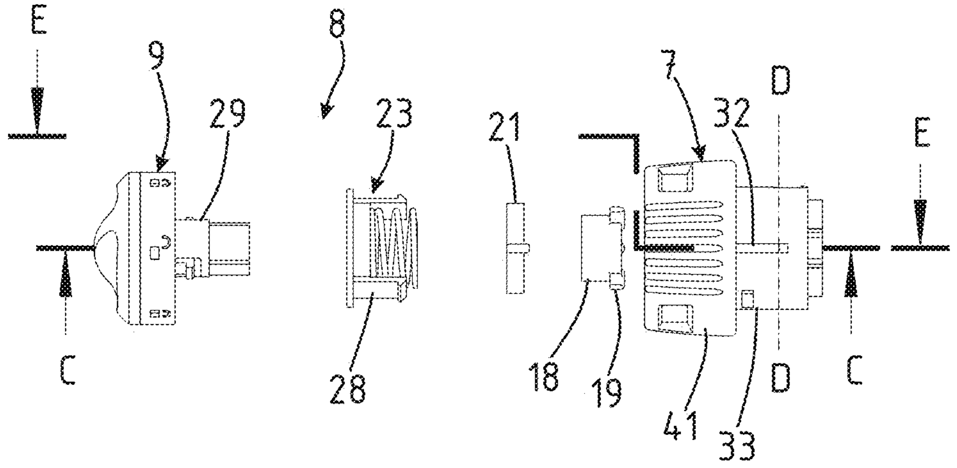
FIG. 6 shows components of the lock and the setting body in a side view.
Figure 7:
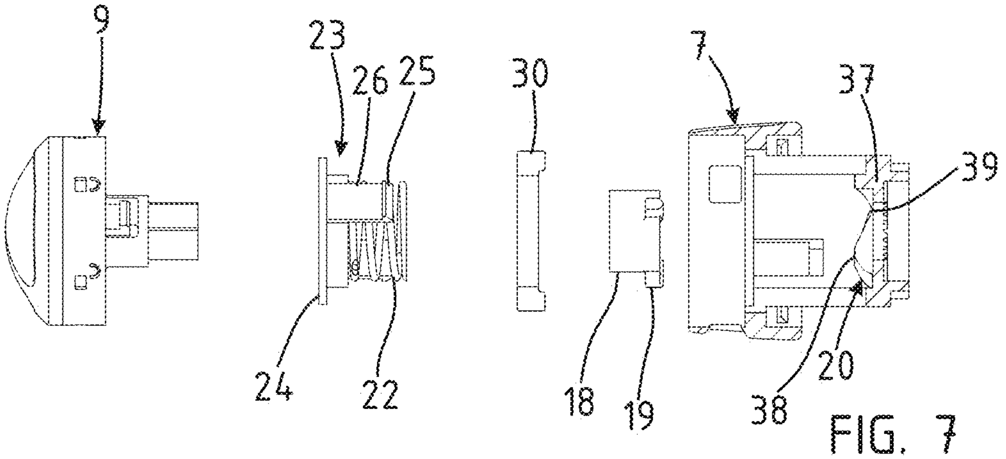
FIG. 7 shows a cross-section through the illustration of FIG. 6 along line C-C.
Figure 8:
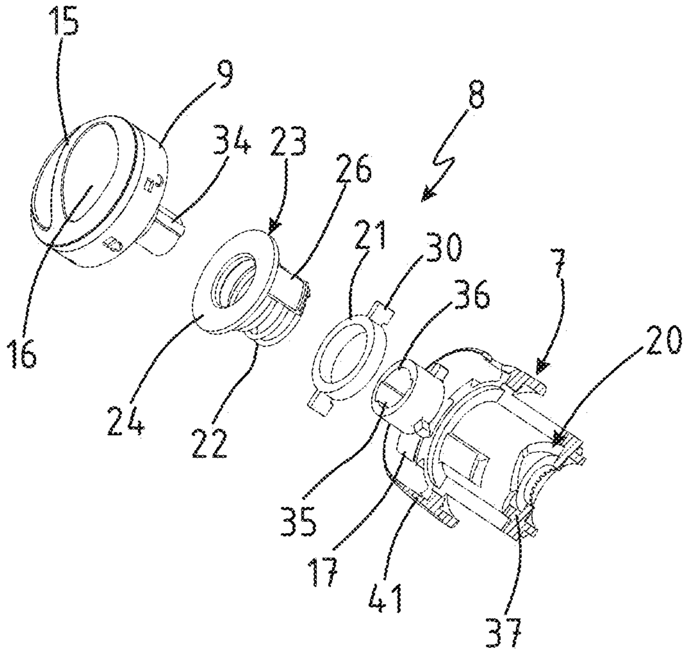
FIG. 8 shows a cross-section through the illustration of FIG. 6 along line E-E.
Figure 9:
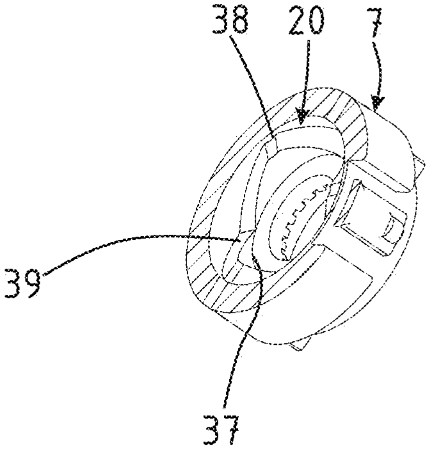
FIG. 9 shows a cross-section through the illustration of FIG. 6 along line D-D.
Figure 10:
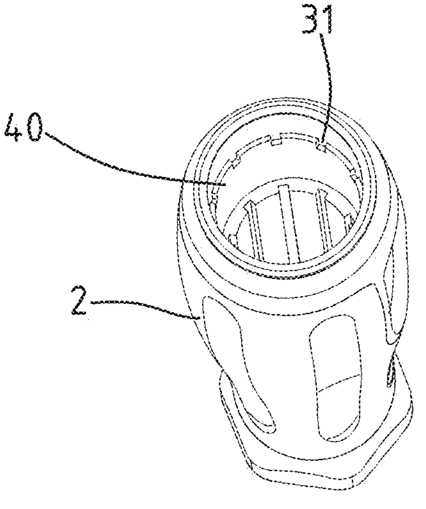
FIG. 10 shows a perspective view of the handle of the torque screwdriver in a view obliquely from above.

The currently adjusted locked state or unlocked state is visible in a viewing window 17 to display the locked state. FIG. 1 shows the torque tool 1 or its setting body 7 in the unlocked state. A symbol in the form of an open padlock can be seen in the viewing window 17. The locked state or unlocked state of the setting body 7 is "unlocked" in the switching position. In this locked state, the torque value can be reduced or increased by rotating the setting body 7. When the target value is reached, the setting element 7 is locked again so that the adjustment value cannot be adjusted unintentionally. FIG. 3 shows the torque tool 1 in the locked state of the setting body 7. A symbol in the form of an closed padlock can be seen in the viewing window 17. The user can see this locked status in the viewing window 17.

A switching ring 18 is assigned to the locking body 9, wherein the switching ring 18 is linearly displaceable relative to the locking body 9. Switching pins 19 are provided on the switching ring 18 and are supported on a control track 20 in the setting body 7. A locking disc and a spring element 22 loading the locking disc are arranged between the switching ring 18 and the locking body 9.

The spring element 22 is a compression spring. The spring element 22 is positioned in a holder component 23. The holder component 23 has a base section 24 and detent elements 25. The detent elements 25 are provided on spring arms 26 which protrude from the base section 24 in the direction of the setting body 7. The detent elements 25 have detents. The detent elements 25 engage in detent receptacles 27 in the setting body 7. The holder component 23 encloses a port 29 of the locking body 9 with a central guide section 28.

The locking disc 21 has latching bodies 30 which interact with latching receptacles 31 in the handle 2. The latching bodies 30 each engage through a longitudinal slot 32 in a sleeve section 33 of the setting body 7.

The locking body 9 and the switching ring 18 can be moved linearly relative to one another by means of guide elements 34, 35. A guide element 34 on the locking body 9 is designed as a guide spring on the socket 29 of the locking body 9. The guide element 35 on the switching ring 18 is designed in the form of a guide groove on the inner circumference 36 of the switching ring 18.

By rotating the locking body 9, the switching pins 19 are moved along the control track 20 in the circumferential direction and an axial movement of the switching ring 18 and the locking disc 21 relative to the handle 2 in its longitudinal axis L is effected. Due to the axial movement, the latching bodies 30 are moved out of the latching receptacles 31 to unlock the setting body 7, whereas the latching elements 30 are brought into engagement with the latching receptacles 31 to lock the setting body 7.

The control track 20 is formed circumferentially on an inner rim 37 of the setting body 7, wherein elevations 38 and depressions 39 are provided in alternation. See in particular the illustrations in FIGS. 8 and 9. Each elevation 38 forms a switching position in which the setting body 7 is unlocked. Each depression 39 forms a switching position in which the setting body 7 is locked.

The number and division of the switching pins 19 corresponds on the one hand to the number and division of the viewing windows 17 provided on the setting body 7 and on the other hand to the periodic repetition of the control track 20 and the alternatingly repeating switching positions formed on the control track 20.

The locking body 9 and the switching ring 18 are radially position-oriented via the guide elements 34, 35, i.e. the guide grooves and the guide springs, but can be moved linearly relative to one another axially, so that the switching ring 18 can move axially when travelling along the control track 20. On the other side, the locking disc 21 is spring-loaded by the spring element 22 and is supported tangentially on the switching pin 19. Each axial movement of the switching ring 18 is transmitted synchronously to the locking disc 21.

The two latching bodies 30 are located on the circumference of the locking disc 21. The latching bodies 30 are designed as web sections. These reach through the longitudinal slots 32 into the sleeve section 33 of the setting body 7 and protrude radially from the circumference of the sleeve section 33. In the locked state, the latching bodies 30 engage in the latching receptacles 31 present in the handle 2 via the spring force of the spring element 22 acting on the locking disc 21. As can be seen in particular in the illustration in FIG. 10, the latching receptacles 31 are formed by grooves. A plurality of such groove-shaped latching receptacles 31 are provided on an inner rim section 40 on the inner circumference of the handle 2. Loaded by the spring force of the spring element 22, the latching bodies 30 are integrated into the latching receptacles 31 when these are congruently one above the other. When the latching body 30 is integrated into the latching receptacles 31, the setting body 7 is coupled to the handle 2 and connected in a torque-proof manner. An adjustment of the setting body 7 is not possible in the locked state of the lock 8.

For unlocking, the locking body 9 is actuated and the switching position is changed from the locked state of the setting body 7 to the unlocked state of the setting body 7. This is done by rotating the locking body 9 around the longitudinal axis L of the handle 2. The rotary movement causes the switching pins 19 to be moved on the control track 20 counter to the spring force of the spring element 22. The transmitted axial movement causes the latching bodies 30 to move out of the latching receptacles 31 in the handle 2, so that the setting body 7 can be rotated relative to the handle 2 and the torque can be adjusted.

The control track 20 running 360° in the setting body 7 enables the switching state or the locked state of the setting body 7 to be changed without a stop, since the switching pins 19 arranged on the switching ring 18 can travel along the control track 20. The direction of rotation in this process is completely arbitrary and takes place without a stop. The elevations 38 and depressions 39 define the corresponding switching points or the locked/unlocked state. The axial position of the locking disc 21 that changes when the control track 20 is travelled along ensures that the setting body 7 is locked or unlocked accordingly.

The latching bodies 30 engage independently or automatically in the latching receptacles 31. This is brought about by the locking disc 21 being permanently subjected to an axial force by the spring element 22.

The viewing windows 17 for displaying the locked state of the setting body 7 are provided on the circumference of a ring section 41 of the setting body 7. In this case, a plurality of viewing windows 17 which are offset relative to one another on the circumference are formed as openings in the ring section 41 of the setting body 7.

The ring section 41 can enclose a cover ring, wherein the cover ring is assigned to the locking body 9 in a rotationally fixed manner. The cover ring has symbols for visualising the unlocked and locked state of the setting body, which are each visible through a viewing window.

Figure 11:
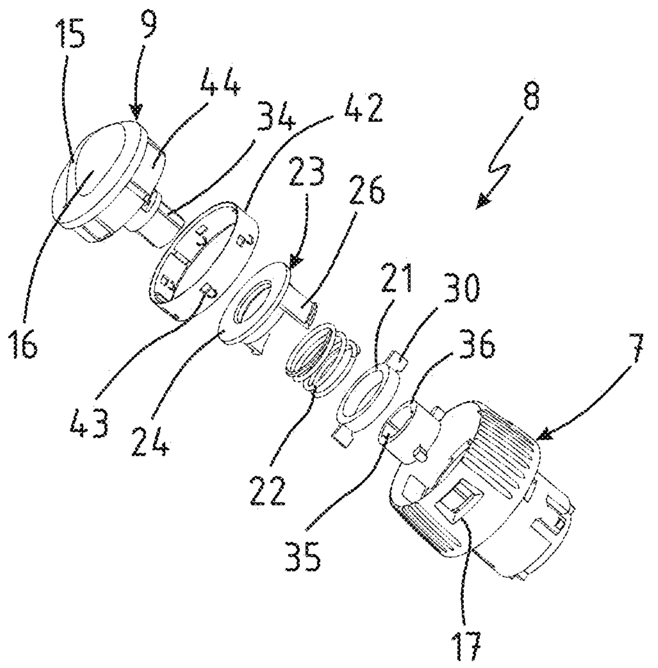
FIG. 11 shows a perspective view of components of a further embodiment of a torque tool.

An embodiment of a torque tool 1 with a cover ring 42 is shown in FIG. 11. Distributed on the circumference of the cover ring 42 are symbols 43 for visualising the unlocked and locked state of the setting body 7. The cover ring 42 is assigned to the locking body 9 in a rotationally fixed manner and is seated on a port section 44 of the locking body 9. The cover ring 42 is surrounded by the ring section 41 of the setting body 7. The symbols 43 for the unlocked or locked state of the setting body 7 can be seen through the viewing window 17.

Otherwise, the embodiment corresponds to that previously described, so that reference is made to the corresponding description with the above explanations and reference numerals.

REFERENCE NUMERALS

1—torque tool
2—handle
3—display
4—output
5—adjustment device
6—compression spring
7—setting body
8—lock
9—locking body
10—holding system
11—digit roller counter
12—digit roller
13—opening in 2
14—grip end
15—grip
16—grip recesses
17—viewing window
18—switching ring
19—switching pin
20—control track
21—locking disc
22—spring element
23—holder component
24—base section
25—detent element
26—spring arm
27—detent receptacle
28—guide section
29—port
30—latching body
31—latching receptacle
32—longitudinal slot
33—sleeve section
34—guide element of 9
35—guide element of 18
36—inner circumference
37—rim
38—elevation
39—depression
40—rim section
41—ring section
42—cover ring
43—symbol
44—port section
L—longitudinal axis of 2

The invention claimed is:

1. A torque tool comprising a handle and a setting body rotatable about a longitudinal axis of the handle for adjusting a torque, the setting body is configured to be unlocked and locked relative to the handle by a locking body, and the locking body is assigned a switching ring, the switching ring is linearly displaceable relative to the locking body and at least one switching pin is on the switching ring, the switching ring is supported on a control track in the setting body, and between the switching ring and the locking body is a locking disc and a spring element loading the locking disc, wherein the locking disc comprises latching bodies which interact with latching receptacles in the handle, and by rotating the locking body, the switching pin is movable along the control track and an axial movement of the switching ring and the locking disc relative to the handle is effected, whereby the latching bodies are configured to be moved out of the latching receptacles to unlock the setting element and brought into engagement with the latching receptacles to lock a setting element.

2. The torque tool according to claim 1, wherein the latching body engages through a longitudinal slot in a sleeve section of the setting body.

3. The torque tool according to claim 1, wherein the locking body and the switching ring are movable linearly relative to one another by a guide element, wherein the guide element is on the locking body as a guide spring on a port of the locking body, and the guide element is on the switching ring as a guide groove on an inner circumference of the switching ring.

4. The torque tool according to claim 1, wherein the control track is formed circumferentially on an inner ring of the setting body, the control track comprising alternating elevations and depressions.

5. The torque tool according to claim 4, wherein each elevation of the elevations comprises a switching position in which the setting body is unlocked and each depression of the depressions comprises a switching position in which the setting body is locked.

6. The torque tool according to claim 1, wherein a viewing window for displaying the locked state of the setting body is on a circumference of a ring section of the setting body.

7. The torque tool according to claim 6, wherein the viewing window comprises a plurality of viewing windows offset from one another on the circumference.

8. The torque tool according to claim 6, wherein the ring section encloses a cover ring, wherein the cover ring is assigned to the locking body in a rotationally fixed manner and the cover ring comprises symbols for visualizing the unlocked and locked state of the setting body, which are visible through at least one viewing window of the plurality of viewing windows.

9. The torque tool according to claim 1, wherein the spring element is on a holder component.

10. The torque tool according to claim 9, wherein the holder component comprises a base section and detent elements, and the detent elements engage in detent receptacles on the setting body.

11. A torque tool comprising a handle and a setting body rotatable about a longitudinal axis of the handle for adjusting a torque, the setting body is configured to be unlocked and locked relative to the handle by a locking body, wherein a switching ring is assigned to the locking body and at least one switching pin is on the switching ring, and the switching ring is supported on a control track in the setting body, the control track is formed 360° circumferentially in the setting body and a change in a switching state of the setting body from unlocking to locking and vice versa takes place by rotating the locking body about a longitudinal axis thereof, and the at least one switching pin and the control track interact so the switching state is changeable without a stop and independently of the direction of rotation of the locking body.

* * * * *